United States Patent
Jones

(10) Patent No.: US 9,218,268 B2
(45) Date of Patent: *Dec. 22, 2015

(54) TESTING TRANSACTION APPLICATIONS

(75) Inventor: Frank P. Jones, New Rochelle, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/446,526

(22) Filed: Apr. 13, 2012

(65) Prior Publication Data

US 2013/0111445 A1    May 2, 2013

Related U.S. Application Data

(63) Continuation of application No. 13/284,814, filed on Oct. 28, 2011.

(51) Int. Cl.
 G06F 9/44   (2006.01)
 G06F 11/36  (2006.01)

(52) U.S. Cl.
 CPC .................................. *G06F 11/3672* (2013.01)

(58) Field of Classification Search
 CPC ............ G06F 11/3688; G06F 11/3664; G06F 11/3684
 USPC ....................................................... 717/124
 See application file for complete search history.

(56) References Cited

U.S. PATENT DOCUMENTS

| | | | |
|---|---|---|---|
| 7,506,311 B2 | 3/2009 | Subramanian et al. | |
| 7,603,658 B2 | 10/2009 | Subramanian et al. | |
| 2004/0199818 A1* | 10/2004 | Boilen et al. | 714/25 |
| 2006/0155807 A1 | 7/2006 | Loupia et al. | |
| 2006/0168115 A1* | 7/2006 | Loupia et al. | 709/218 |
| 2006/0206559 A1* | 9/2006 | Xie et al. | 709/201 |

(Continued)

FOREIGN PATENT DOCUMENTS

| | | |
|---|---|---|
| CN | 1996375 A | 7/2007 |
| CN | 101241467 A | 8/2008 |

(Continued)

OTHER PUBLICATIONS

International Search Report and Written Opinion received in International Patent Application No. PCT/IB2012/055668, Dated Mar. 14, 2013, pp. 1-13.

(Continued)

*Primary Examiner* — Li B Zhen
*Assistant Examiner* — Hui-Wen Lin
(74) *Attorney, Agent, or Firm* — Holland & Knight LLP; Brian J. Colandreo, Esq.; Jeffrey T. Placker, Esq.

(57) ABSTRACT

A method, computer program product, and system for testing transaction applications is described. A method may comprise importing, via one or more computing devices, one or more web service components configured to exchange, at least in part, testing data between a testing application and a transaction application. The testing application may be configured, at least in part, to test the transaction application. The method may further comprise testing, via the one or more computing devices, the transaction application using, at least in part, the one or more web service components to exchange testing data between the testing application and the transaction application.

7 Claims, 8 Drawing Sheets

(56) References Cited

U.S. PATENT DOCUMENTS

| | | |
|---|---|---|
| 2008/0059558 A1 | 3/2008 | Singh et al. |
| 2008/0133210 A1* | 6/2008 | Chagoly et al. ................ 703/22 |
| 2008/0216059 A1 | 9/2008 | Moudgal |
| 2009/0106742 A1 | 4/2009 | Shah et al. |
| 2010/0332529 A1 | 12/2010 | Nayak et al. |
| 2011/0138001 A1 | 6/2011 | Keum et al. |

FOREIGN PATENT DOCUMENTS

| | | |
|---|---|---|
| CN | 103890735 A | 6/2014 |
| DE | 112012001100 A | 1/2015 |
| GB | 2509647 A | 9/2014 |
| JP | 2015502593 A | 1/2015 |
| WO | 2013061217 A1 | 2/2013 |

OTHER PUBLICATIONS

International Preliminary Report of Patentability received in International Patent Application No. PCT/IB2012/055668, Dated Apr. 29, 2014, pp. 1-7.

* cited by examiner

TESTING TRANSACTION APPLICATIONS

BACKGROUND OF THE INVENTION

Transaction systems, including, for example, banking systems and/or securities trading systems, may include back end applications that perform logic that may be necessary to conduct transactions. A front end of these systems may be designed for presentation and ease of use and may enable one or more users to input information. The front end of these systems may call one or more applications in the back end in order to execute the logic to conduct the transaction. In some situations, these back end systems may be difficult to test because there may not be a user interface through which to access them.

BRIEF SUMMARY OF THE INVENTION

In an embodiment, a method may include importing, via one or more computing devices, one or more web service components configured to exchange, at least in part, testing data between a testing application and a transaction application. The testing application may be configured, at least in part, to test the transaction application. The method may further include testing, via the one or more computing devices, the transaction application using, at least in part, the one or more web service components to exchange testing data between the testing application and the transaction application.

One or more of the following features may be included. The one or more web service components may be further configured to exchange testing data between the testing application and a transaction application interface. The transaction application interface may be configured to enable, at least in part, communication with the transaction application. The method may further include defining, via, at least in part, the one or more web service components, one or more input parameters and one or more return parameters for the transaction application interface. Testing the transaction application may further include receiving testing data via, at least in part the one or more web service components. Testing the transaction application may also include passing the testing data to the transaction application via, at least in part, the transaction application interface.

In an implementation, the method may include exporting a transaction application interface configured to enable, at least in part, communication with the transaction application, to a software development application. The method may further include generating the one or more web service components via, at least in part, the software development application based upon, at least in part, the transaction application interface. The transaction application interface may be an application program interface associated with the transaction application. The testing application may be configured, at least in part, to perform functional regression testing on the transaction application. The method may additionally include receiving input test data via, at least in part, the one or more web service components, from the testing application. The method also include transmitting result test data via, at least in part, the one or more web service components, to the testing application.

In an embodiment, a computer program product may reside on a computer readable storage medium and may have a plurality of instructions stored on it. When executed by a processor, the instructions may cause the processor to perform operations including importing, via one or more computing devices, one or more web service components configured to exchange, at least in part, testing data between a testing application and a transaction application. The testing application may be configured, at least in part, to test the transaction application. The operations may further include testing, via the one or more computing devices, the transaction application using, at least in part, the one or more web service components to exchange testing data between the testing application and the transaction application.

One or more of the following features may be included. The one or more web service components may be further configured to exchange testing data between the testing application and a transaction application interface. The transaction application interface may be configured to enable, at least in part, communication with the transaction application. The operations may further include defining, via, at least in part, the one or more web service components, one or more input parameters and one or more return parameters for the transaction application interface. Testing the transaction application may further include receiving testing data via, at least in part the one or more web service components. Testing the transaction application may also include passing the testing data to the transaction application via, at least in part, the transaction application interface.

In an implementation, the operations may include exporting a transaction application interface configured to enable, at least in part, communication with the transaction application, to a software development application. The operations may further include generating the one or more web service components via, at least in part, the software development application based upon, at least in part, the transaction application interface. The transaction application interface may be an application program interface associated with the transaction application. The testing application may be configured, at least in part, to perform functional regression testing on the transaction application. The operations may additionally include receiving input test data via, at least in part, the one or more web service components, from the testing application. The operations also include transmitting result test data via, at least in part, the one or more web service components, to the testing application.

In an embodiment, a computing system is provided. The computing system may include at least one processor and at least one memory architecture coupled with the at least one processor. The computing system may also include a first software module executable by the at least one processor and the at least one memory architecture, wherein the first software module may be configured to import one or more web service components configured to exchange, at least in part, testing data between a testing application and a transaction application, The testing application may be configured, at least in part, to test the transaction application. Further, the computing system may include a second software module which may be configured to test the transaction application using, at least in part, the one or more web service components to exchange testing data between the testing application and the transaction application.

One or more of the following features may be included. The one or more web service components may be further configured to exchange testing data between the testing application and a transaction application interface. The transaction application interface may be configured to enable, at least in part, communication with the transaction application. A third software module may be configured to define, via, at least in part, the one or more web service components, one or more input parameters and one or more return parameters for the transaction application interface. The second software module may be further configured to, at least in part receive testing data via, at least in part the one or more web service components. Additionally, the second software module may be further configured to, at least in part pass the testing data to the transaction application via, at least in part, the transaction application interface.

In an implementation a fourth software module may be configured to export a transaction application interface configured to enable, at least in part, communication with the transaction application, to a software development application. A fifth software module may be configured to generate the one or more web service components via, at least in part, the software development application based upon, at least in part, the transaction application interface. The transaction application interface may be an application program interface associated with the transaction application. The testing application may be configured, at least in part, to perform functional regression testing on the transaction application. A sixth software module may be configured to receive input test data via, at least in part, the one or more web service components, from the testing application. A seventh software module may be configured to transmit result test data via, at least in part, the one or more web service components, to the testing application.

In an embodiment, a method may include importing, via the one or more computing devices, one or more web service components configured to exchange, at least in part, testing data between a functional regression testing application and a transaction application program interface. The functional regression testing application may be configured, at least in part, to test a transaction application configured to communicate with other software applications via, at least in part, the transaction application program interface. The method may further include testing, via the one or more computing devices, the transaction application using, at least in part, the one or more web service components to exchange testing data between the functional regression testing application and the transaction application program interface.

The details of one or more implementations are set forth in the accompanying drawings and the description below. Other features and advantages will become apparent from the description, the drawings, and the claims.

DETAILED DESCRIPTION OF THE INVENTION

Figure 1:
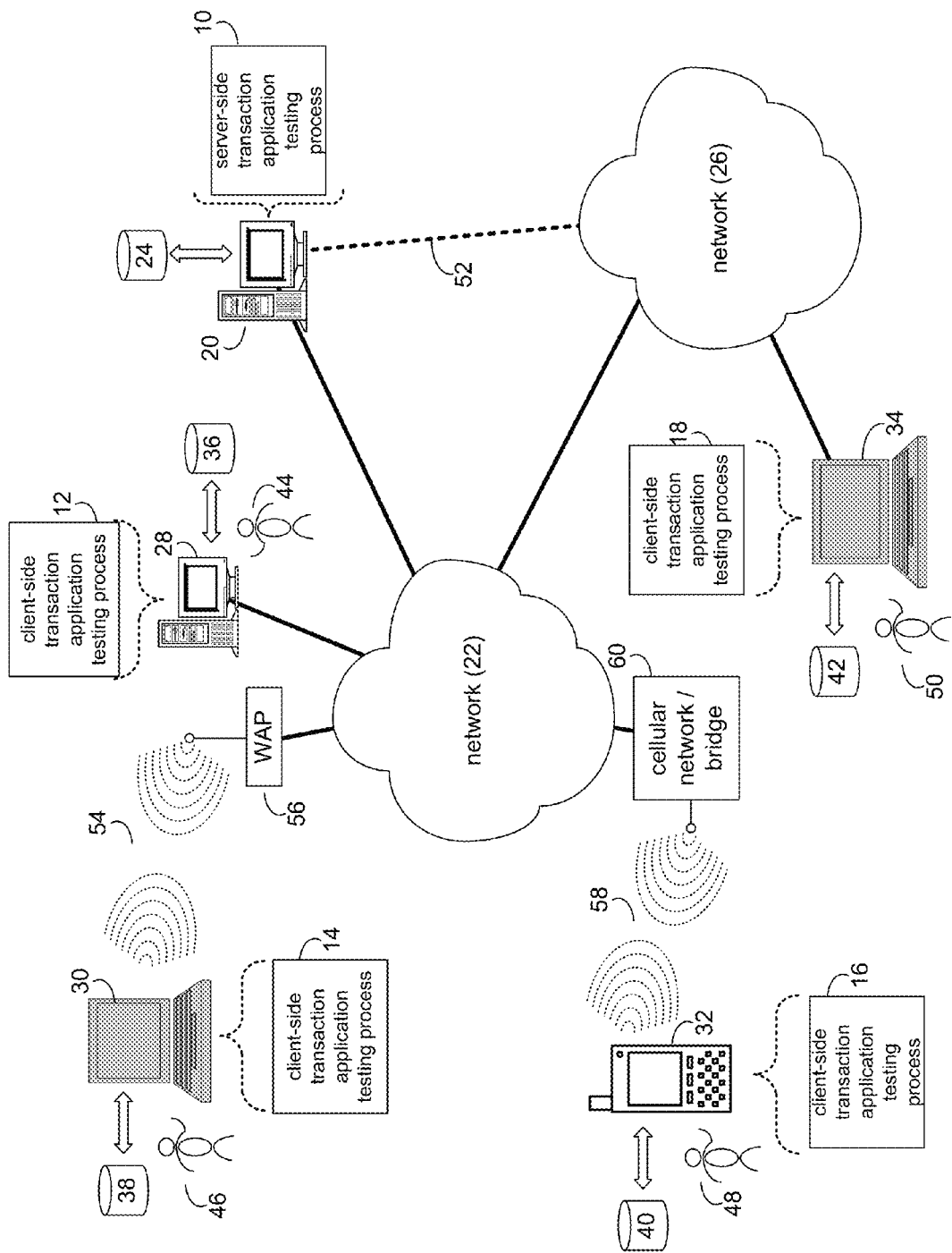
FIG. 1 is a diagrammatic view of a transaction application testing process coupled to a distributed computing network.
Figure 2:
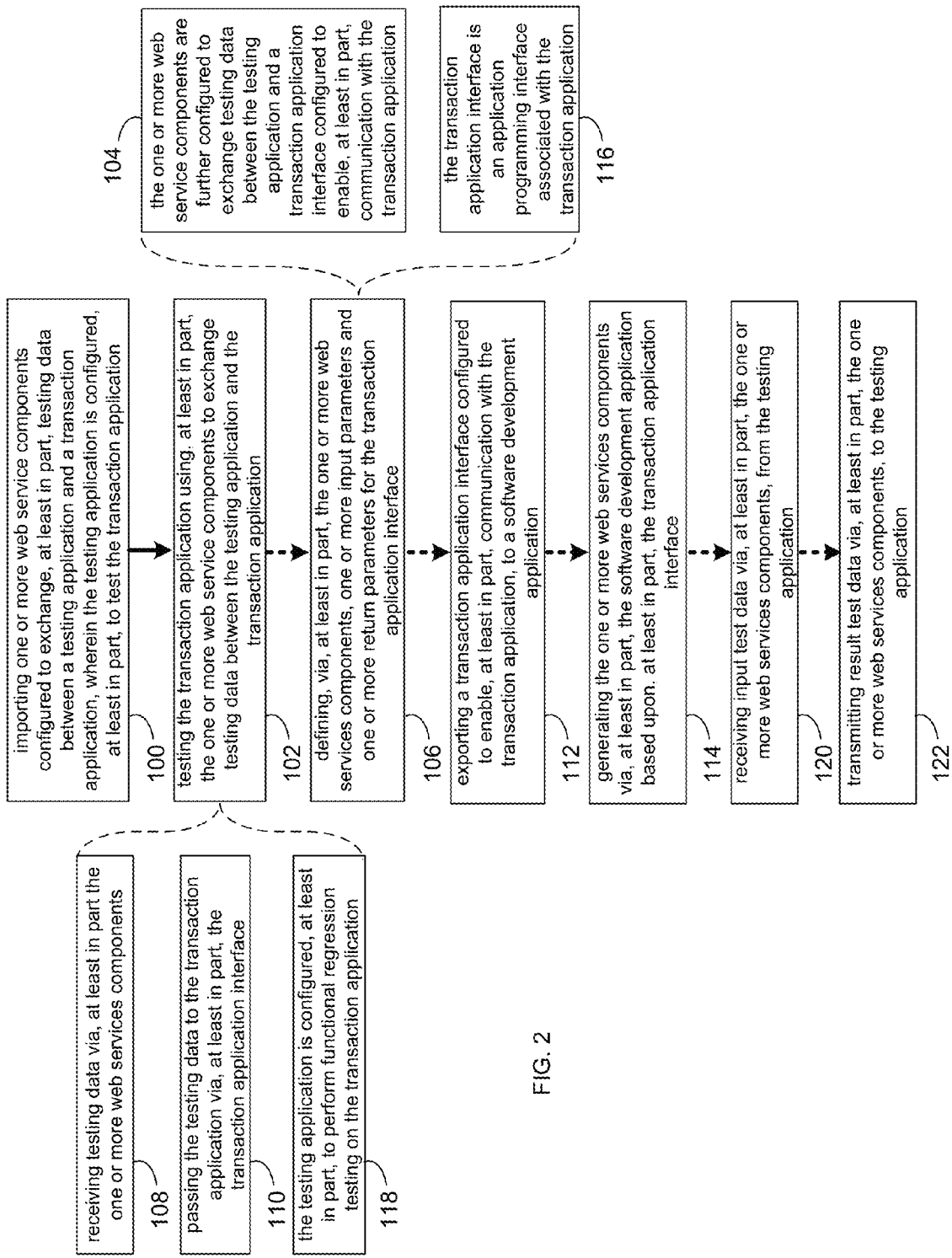
FIG. 2 is a flowchart of the transaction application testing process of FIG. 1.

Referring to FIGS. 1 & 2, there is shown a transaction application testing process 10. As will be discussed below, transaction application testing process 10 may import 100, one or more web service components configured to exchange, at least in part, testing data between a testing application and a transaction application. The testing application may be configured, at least in part, to test the transaction application. Transaction application testing process 10 may also test 102 the transaction application using, at least in part, the one or more web service components to exchange testing data between the testing application and the transaction application.

The transaction application testing (TAT) process may be a server-side process (e.g., server-side TAT process 10), a client-side process (e.g., client-side TAT process 12, client-side TAT process 14, client-side TAT process 16, or client-side TAT process 18), or a hybrid server-side/client-side process (e.g., the combination of server-side TAT process 10 and one or more of client-side TAT processes 12, 14, 16, 18).

Server-side TAT process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft Windows Server; Novell Netware; or Red Hat Linux, for example.

The instruction sets and subroutines of server-side TAT process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS, Novell Web Server, or Apache Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side TAT processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft Windows, Microsoft Windows CE, Red Hat Linux, or a custom operating system.

The instruction sets and subroutines of client-side TAT processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side TAT processes 12, 14, 16, 18 and/or server-side TAT process 10 may be processes that run within (i.e., are part of) a software development platform (e.g., IBM® Rational® Software Development Platform). Alternatively, client-side TAT processes 12, 14, 16, 18 and/or server-side TAT process 10 may be stand-alone applications that work in conjunction with the software development platform. One or more of client-side TAT processes 12, 14, 16, 18 and server-side TAT process 10 may interface with each other (via network 22 and/or network 26). TAT process 10 may also run within any software development application and/or any software testing application.

Users 44, 46, 48, 50 may access server-side TAT process 10 directly through the device on which the client-side TAT process (e.g., client-side TAT processes 12, 14, 16, 18) is executed, namely client electronic devices 28, 30, 32, 34, for example. Users 44, 46, 48, 50 may access server-side TAT process 10 directly through network 22 and/or through secondary network 26. Further, server computer 20 (i.e., the computer that executes server-side TAT process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/TAT) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Transaction Application Testing (TAT) Process

For the following discussion, server-side TAT process 10 will be described for illustrative purposes. It should be noted that client-side TAT process 12 may interact with server-side TAT process 10 and may be executed within one or more applications that allow for communication with client-side TAT process 12. However, this is not intended to be a limitation of this disclosure, as other configurations are possible (e.g., stand-alone, client-side TAT processes and/or stand-alone server-side TAT processes.) For example, some implementations may include one or more of client-side TAT processes 12, 14, 16, 18 in place of or in addition to server-side TAT process 10. It should be noted that one or more of the operations of the TAT processes discussed herein may be performed solely by the one or more TAT processes, solely by one or more of a transaction application, a testing application, and a software development application, or by a combination of one or more of the TAT processes and one or more of the transaction application, the testing application, and the software development application.

Back end systems of transaction applications that perform logic that may be necessary to conduct transactions (e.g., banking transactions, securities trading transactions, etc.) may not have interfaces that make them accessible for testers. In some situations, testers may design front end applications for the specific purpose of testing these back end applications. These front end applications are sometimes referred to as scaffolding, and may enable testers to exchange testing data with the back end applications. Sometimes, this leads to insufficient testing of back end applications, or no testing at all. Sufficient testing may be easier to conduct if testers can avoid designing front end applications for the specific purpose of testing.

For example, transaction applications may execute in a transaction server without user terminal interaction (e.g., without interaction with a user). One or more transactions may interact with other components (e.g., calling programs 718 in FIG. 7) through an application program interface to transmit data parameters to and from the program. This type of application architecture may allow separation of business and user functional requirements from presentation of information and control. Since there is no user terminal interface, it may be difficult for developers of these transaction applications to test them. By integrating one or more of: an application program interface of the transaction application (e.g., a transaction application interface), web services definitions (e.g., web service artifacts and/or components), a web services development application and/or tooling (e.g., a software development application), and an automated functional testing tool (e.g., a testing application), the testing of these transaction applications may facilitated for developers.

Figure 3:
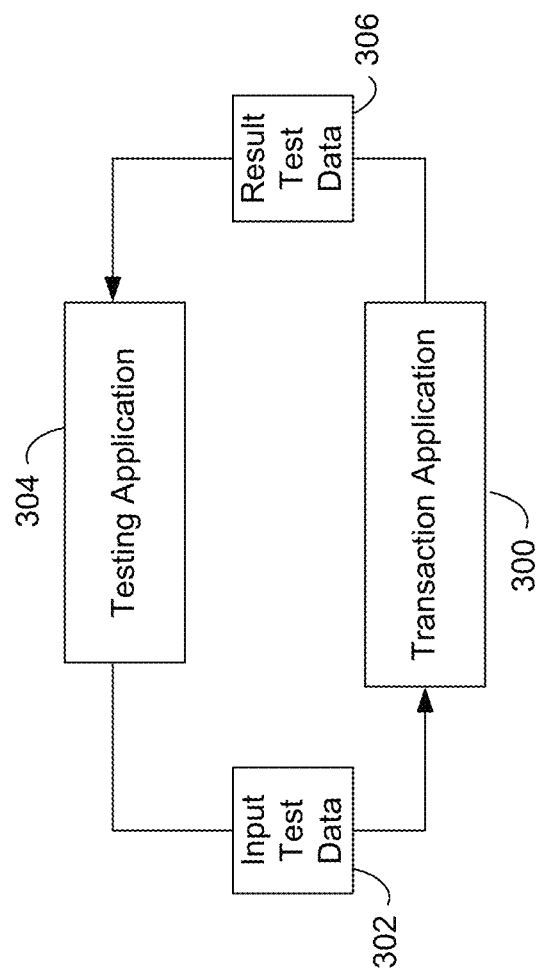
FIG. 3 is a diagrammatic flowchart associated with the transaction application testing process of FIG. 1.

For example, and referring now to FIG. 3, during testing, transaction application 300 (e.g., a business application, banking application, and/or securities trading application), which may include a back end application, may receive input test data 302 from testing application 304 and may transmit result test data 306 back to testing application 304. Result test data 306 may be the output of transaction application 300 after input test data 302 has been processed by transaction application 300. Testing application 300 may be, e.g., a functional test tool and may perform functional regression testing on transaction application 300. Functional regression testing may be testing configured to find new errors after changes have been made to an application. If transaction application 300 includes one or more back end applications, it may be difficult, as discussed above, to pass input test data 302 to transaction application 300 and receive result test data 306 from transaction application 300 without designing scaffolding for testing.

Figure 4:
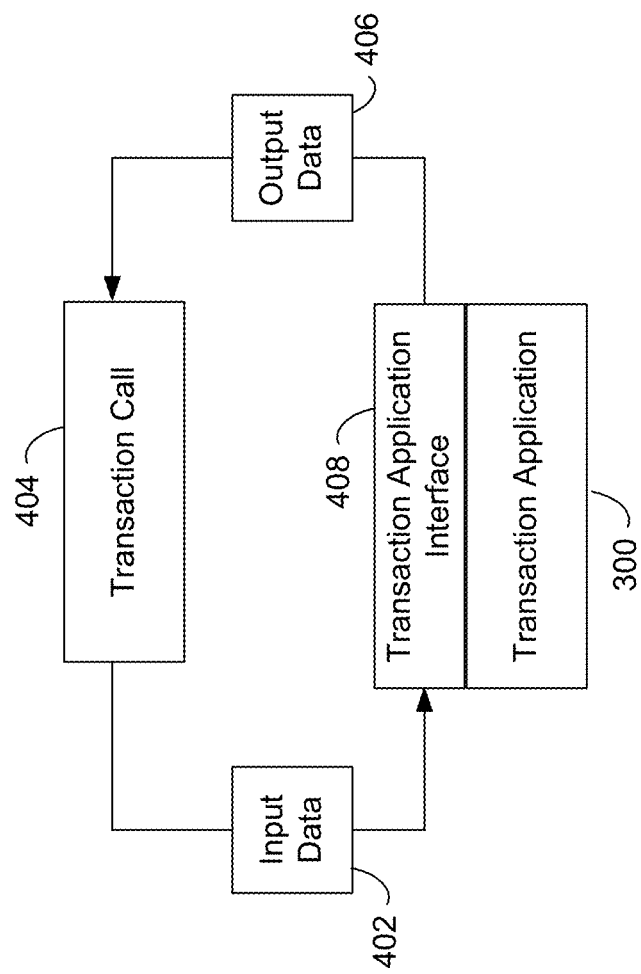
FIG. 4 is also a diagrammatic flowchart associated with the transaction application testing process of FIG. 1.

Referring now also to FIG. 4, during normal operation, transaction application 300 may have an associated transaction application interface 408. Transaction application interface 408 may provide a set of rules and/or specifications that other software programs may follow in order to communicate with transaction application interface 408. In operation, transaction application 300 may be invoked by transaction call 404. Transaction application interface 408 may receive input data 402 from transaction call 404 and may pass input data 402 to transaction application 300. Transaction application 300 may perform operations on input data 402 and pass output data 406 back to transaction call 404 via transaction application interface 408. In this way, transaction application interface 408 may be used to pass data to and receive data from transaction application 300. In some situations, transaction application interface 408 may be used to pass test data to and receive results data from transaction application 300 to assist in testing.

Further, the transaction application interface may be used to create, derive, or generate one or more web service artifacts and/or components. A web service may be a software system designed to support computer interaction over a network. A web service definition language may be a language for describing functionality available from a web service and may describe how one or more web services can be called, the parameters of the web service, and more. The one or more web service components may be used to pass test data to and receive results data from transaction application 300 to assist in testing. Further, in some situations, the one or more web service components may be used in conjunction with the transaction application interface in order to pass test data to and receive results data from transaction application 300 to assist in testing.

Figure 5:
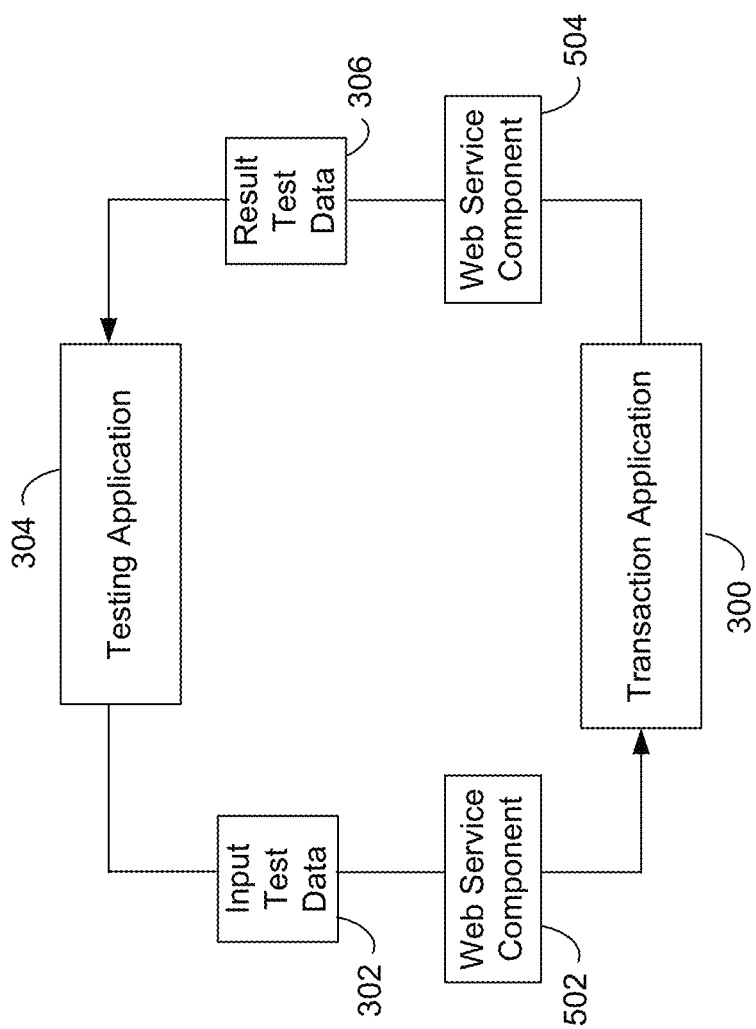
FIG. 5 is also a diagrammatic flowchart associated with the transaction application testing process of FIG. 1.

Referring now also to FIGS. 1 and 5, TAT process 10 may import 100 one or more web service components (e.g., web service components 502, 504) configured to exchange, at least in part, testing data (e.g., input test data 302, result test data 306) between testing application 304 and a transaction application 300. Testing application 304 may be configured, at least in part, to test transaction application 300. Further, TAT process 10 may test 102 transaction application 300 using, at least in part, one or more web service components (e.g., web service components 502, 504) to exchange testing data (e.g., input test data 302, result test data 306) between testing application 304 and the transaction application 300.

Figure 6:
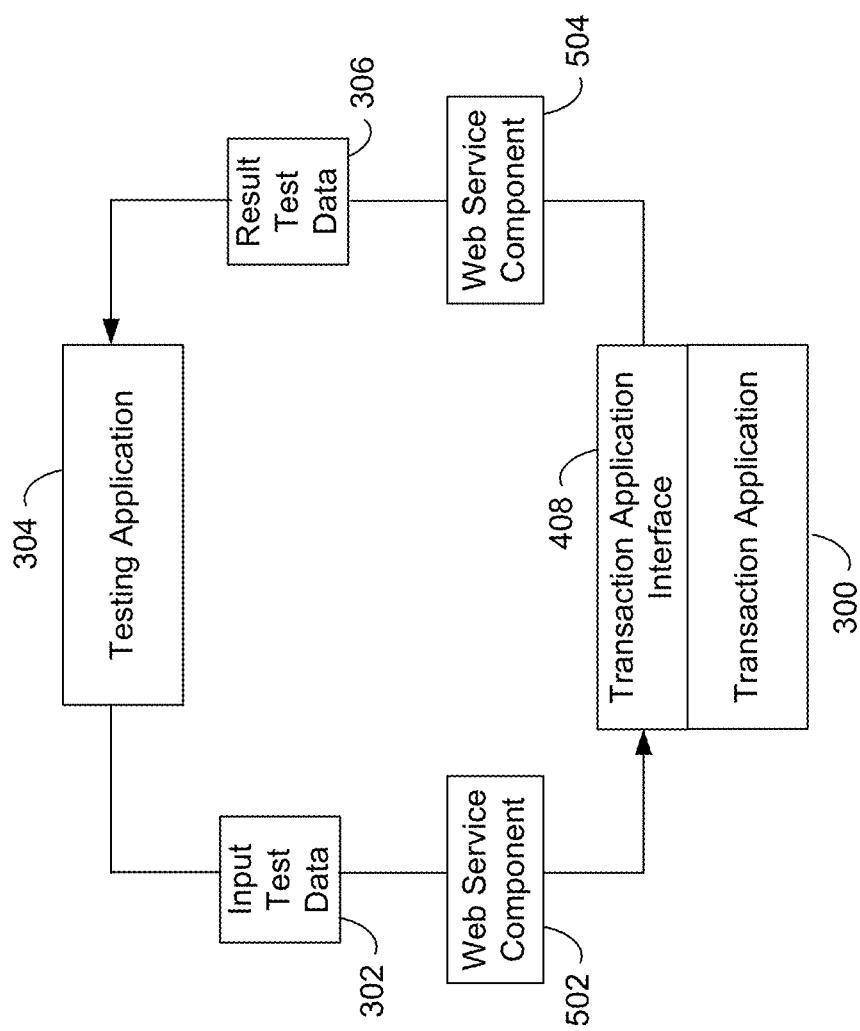
FIG. 6 is also a diagrammatic flowchart associated with the transaction application testing process of FIG. 1.

Referring now also to FIG. 6, the one or more web service components (e.g., web service components 502, 504) may be (104) further configured to exchange testing data (e.g., input test data 302, result test data 306) between testing application 304 and transaction application interface 408. Transaction application interface 408 may be configured to enable, at least in part, communication with transaction application 300. For example, transaction application interface 408 may be a set of rules and/or specifications for allowing other software programs to communicate with transaction application 300. In an embodiment, TAT process 10 may define 106 via, at least in part, one or more web service components (e.g., web service components 502, 504), one or more input parameters and one or more return parameters for transaction application interface 408. These input parameters and return parameters may be configured in accordance with the rules and/or specifications of transaction application interface 408 for allowing one or more web service components to (e.g., web service components 502, 504) to communicate with transaction application 300.

Continuing the with the example, above TAT process 10 may receive 108 testing data (e.g., input test data 302) via, at least in part the one or more web service components (e.g., web service component 502). Result test data 306 may be received at transaction application interface 408. Further, TAT process 10 may pass 110 testing data (e.g., input test data 302) to transaction application 300 via, at least in part, transaction application interface 408.

Figure 7:
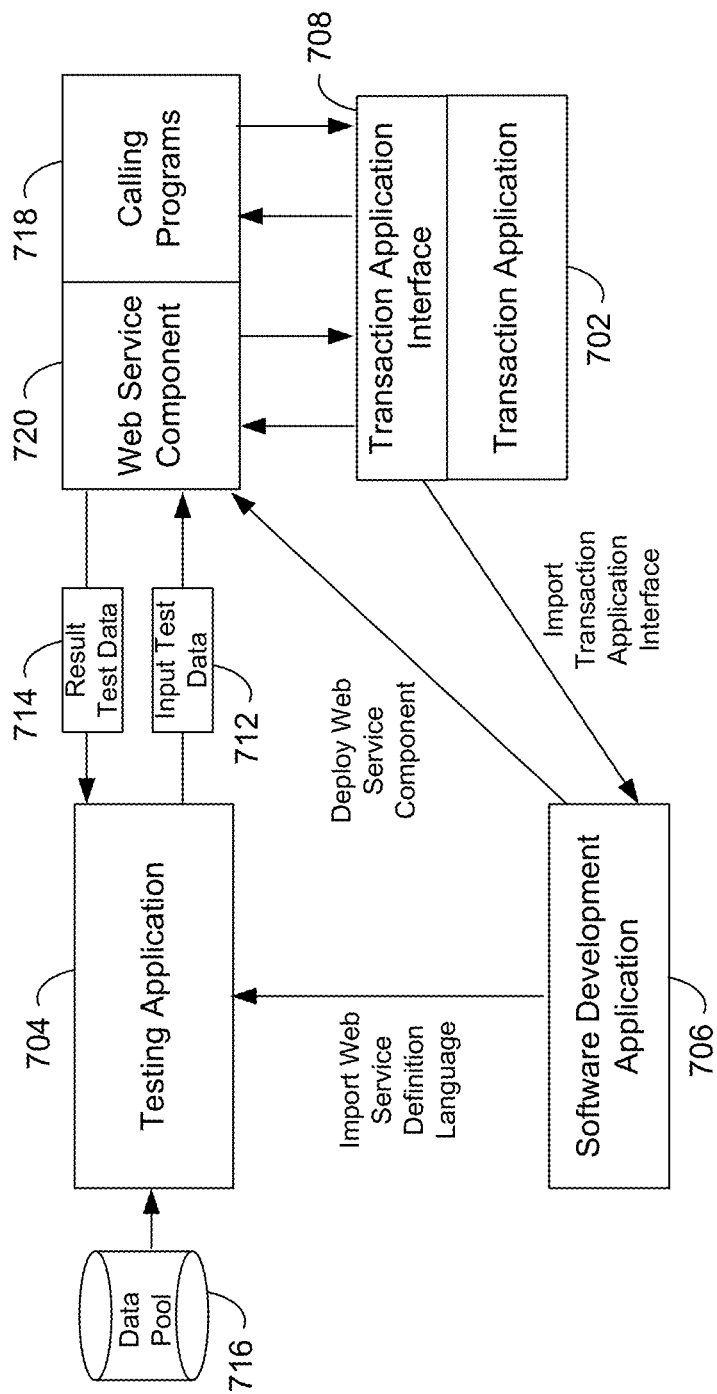
FIG. 7 is also a diagrammatic flowchart associated with the transaction application testing process of FIG. 1.

In an embodiment, and referring now also to FIG. 7, TAT process 10 may export 112 transaction application interface 708 configured to enable, at least in part, communication with transaction application 702, to software development application 706. TAT process 10 may import transaction application interface 708 at software development application 706. Software development application 706 may be a web service development application and may support the creation of a web service. Further, TAT process 10, in connection with software development application 706, may be configured to extract transaction application interface 708 and import it for use in creating one or more web service components.

For example, TAT process 10 may generate 114 one or more web service components (e.g., web service component 720) via, at least in part, software development application 706 based upon, at least in part, transaction application interface 708. Transaction application interface 708 may be (116) an application program interface associated with transaction application 300. Upon generating web service component 720, TAT process 10 may, in connection with software development application 706, deploy web service component 720. Web service component 720 may be deployed to transaction application 702, or one or more computing devices executing transaction application 702. In this way, TAT process 10 may use an application program interface associated with transaction application 300 to create a web service interface to facilitate regression testing of transaction application 300.

In an embodiment, TAT process 10, in connection with software development application 706, may create and/or generate a web service definition language associated with the web services and/or web service components used to communicate with transaction application interface 708. As noted above, a web service definition language may be a language for describing functionality available from a web service and may describe how one or more web services can be called, the parameters of the web service, and more. TAT process 10 may, in connection with software development application 706, export the web service definition language to testing application 704. Further, TAT process 10 may, in connection with testing application 704, import the web service definition language.

Testing application 704 may be configured, at least in part, to test transaction application 702. Further, testing application 704 may be (118) configured, at least in part, to perform functional regression testing on transaction application 702. As mentioned above, functional regression testing may be used to find new errors after changes have been made to an application. In an embodiment, testing application 704 may be configured to perform automatic functional regression testing. In other words, testing application 704 may execute regression test cases on transaction application 702 automatically.

TAT process 10, in connection with transaction application 702, may receive 120 input test data (e.g., input test data 712) via, at least in part, the one or more web service components (e.g., web service component 720), from testing application 704. Further TAT process 10 may use input test data 712 to run transaction application 702, which may, in response, output result test data 714. Further, TAT process 10 may transmit 122 result test data 714 via, at least in part, the one or more web service components (e.g., web service component 720), to testing application 704.

Testing application 704 may support web services testing and scripting capability. Further, testing application 704 may include a regression test tool. The regression test tool may use the web service definition to record a script of activities using one or more predefined parameters to test result set data 714 against one or more predefined, expected values. In this way, success of the testing of transaction application 702 may be determined, and appropriate changes may be made, if necessary.

For example, a testing application user may use a functional test tool included with testing application 704 to record a test session using one or more input and return parameters that may be defined by the transaction application interface. The testing application user may import the web service definition language to create a web service functional test and create a data pool of input test data for the transaction application along with expected results. The functional test tool may step through the transaction application and may record each step and result. When the steps are completed the functional test tool user may save the recorded session as a script for future testing. In this way, a data pool (e.g., data pool 716) for the or more input and return parameters and the expected results may be created for the functional test tool based upon, at least in part, the script from above. The functional test tool user may then execute the recorded script, using the data in the data pool, to test the transaction application.

The functional test tool may communicate with the web service component associated with the transaction application using simple object access protocol (SOAP) and/or TCP/IP protocol and may execute a functional test of the transaction application using the web service. The web service component (e.g., web service component 720) associated with the transaction application (e.g., transaction application 702) may call and communicate with the transaction application through the transaction application interface, which may be an application program interface.

When the transaction application has run with the input test data (e.g., input test data 712 from data pool 716), it may return the results (e.g., result set data 712) through transaction application interface 708 to web service component 720. Web service component 720 may send the results back to the functional test tool (e.g., associated with testing application 704). The functional test tool may compare the results against the expected results that may be stored in the data pool. The results may then be reported to the user by the functional test tool.

Figure 8:
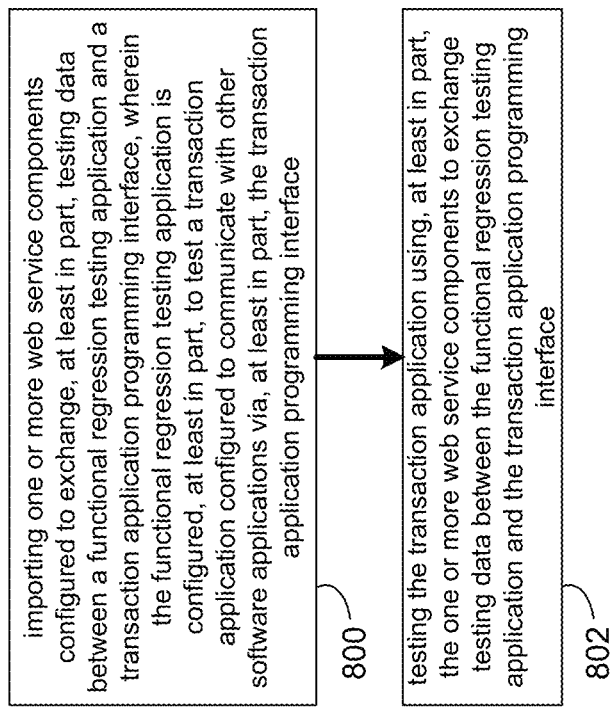
FIG. 8 is a flowchart of a transaction application testing process.

Referring now also to FIG. 8, in an embodiment, TAT process 10 may import 100 one or more web service components (e.g., web service component 720) configured to exchange, at least in part, testing data (e.g., input test data 712, result test data 714) between a functional regression testing application (e.g., testing application 704) and a transaction application program interface (e.g., transaction application interface 708). The functional regression testing application (e.g., testing application 704) may be configured, at least in part, to test transaction application 702. Transaction application 702 may be configured to communicate with other software applications via, at least in part, transaction application program interface 708. Further, TAT process 10 may test 802 transaction application 702 using, at least in part, the one or more web service components (e.g., web service component 720) to exchange testing data (e.g., input test data 712, result test data 714) between functional regression testing application 704 and transaction application program interface 708.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
    importing, via one or more computing devices, one or more web service components configured to exchange, at least in part, testing data between a testing application and a transaction application, wherein the testing application is configured, at least in part, to test the transaction application;
    automatically generating, via the one or more computing devices, a web service interface using an application program interface associated with the transaction application to facilitate regression testing of the transaction application;
    exporting a transaction application interface of the transaction application configured to enable, at least in part, communication with the transaction application, to a software development application;
    generating the one or more web service components via, at least in part, the software development application based upon, at least in part, the transaction application interface;
    recording, via the one or more computing devices, a script of activities using one or more predefined parameters to create a data pool of one or more input parameters, one or more return parameters, and expected results;
    saving, via the one or more computing devices, the script of activities as a recorded session for future automatic testing;
    automatically testing, via the one or more computing devices, the transaction application using, at least in part, the saved script of activities and the one or more web service components to exchange testing data between the testing application and the transaction application and executing the recorded script to use the data pool to automatically test the transaction application;
    receiving input test data via, at least in part, a first web service component of the one or more web service components, from the testing application;
    transmitting result test data via, at least in part, a second web service component of the one or more web service components, to the testing application; and
    comparing, via the one or more computing devices, results of testing the transaction application against the expected results from the data pool.

2. The method of claim 1, wherein the one or more web service components are further configured to exchange testing data between the testing application and a transaction application interface configured to enable, at least in part, communication with the transaction application.

3. The method of claim 2, further comprising:
    defining, via, at least in part, the one or more web service components, the one or more input parameters and the one or more return parameters for the transaction application interface.

4. The method of claim 2, wherein testing the transaction application further comprises:
    receiving testing data via, at least in part the one or more web service components; and
    passing the testing data to the transaction application via, at least in part, the transaction application interface.

5. The method of claim 2, wherein the transaction application interface is an application program interface associated with the transaction application.

6. The method of claim 1, wherein the testing application is configured, at least in part, to perform functional regression testing on the transaction application.

7. A method comprising:
    importing, via the one or more computing devices, one or more web service components configured to exchange, at least in part, testing data between a functional regression testing application and a transaction application program interface, wherein the functional regression testing application is configured, at least in part, to test a transaction application configured to communicate with other software applications via, at least in part, the transaction application program interface;
    automatically generating, via the one or more computing devices, a web service interface using the transaction application program interface associated with the transaction application to facilitate regression testing of the transaction application;
    exporting a transaction application interface of the transaction application configured to enable, at least in part, communication with the transaction application, to a software development application;

generating the one or more web service components via, at least in part, the software development application based upon, at least in part, the transaction application interface;

recording, via the one or more computing devices, a script of activities using one or more predefined parameters to create a data pool of one or more input parameters, one or more return parameters, and expected results;

saving, via the one or more computing devices, the script of activities as a recorded session for future automatic testing;

automatically testing, via the one or more computing devices, the transaction application using, at least in part, the saved script of activities and the one or more web service components to exchange testing data between the functional regression testing application and the transaction application program interface and executing the recorded script to use the data pool to automatically test the transaction application;

receiving input test data via, at least in part, a first web service component of the one or more web service components, from the testing application;

transmitting result test data via, at least in part, a second web service component of the one or more web service components, to the testing application; and comparing, via the one or more computing devices, results of testing the transaction application against the expected results from the data pool.

\* \* \* \* \*